(12) United States Patent
Sultenfuss et al.

(10) Patent No.: US 7,996,596 B2
(45) Date of Patent: Aug. 9, 2011

(54) MULTIPLE MINICARD INTERFACE SYSTEM AND METHOD THEREOF

(75) Inventors: Andrew T. Sultenfuss, Leander, TX (US); James R. Utz, Round Rock, TX (US)

(73) Assignee: Dell Products, LP, Round Rock, TX (US)

( * ) Notice: Subject to any disclaimer, the term of this patent is extended or adjusted under 35 U.S.C. 154(b) by 46 days.

(21) Appl. No.: 12/505,221

(22) Filed: Jul. 17, 2009

(65) Prior Publication Data

US 2011/0016252 A1    Jan. 20, 2011

(51) Int. Cl.
*G06F 13/00* (2006.01)
*G06F 13/20* (2006.01)
*G06F 9/00* (2006.01)
*G06F 15/00* (2006.01)

(52) U.S. Cl. ............ 710/313; 710/301; 713/2; 345/501

(58) Field of Classification Search .................. 710/313, 710/301; 713/2; 345/501
See application file for complete search history.

(56) References Cited

U.S. PATENT DOCUMENTS

| | | | |
|---|---|---|---|
| 7,083,423 B1 | 8/2006 | Guerra, Jr. et al. | |
| 7,095,415 B2 * | 8/2006 | Chang et al. | 345/520 |
| 7,097,512 B1 * | 8/2006 | Hsiao et al. | 439/630 |
| 7,272,017 B2 | 9/2007 | Kwatra et al. | |
| 7,278,872 B2 | 10/2007 | Brown et al. | |
| 7,400,516 B2 | 7/2008 | Chih-Min et al. | |
| 7,440,293 B2 | 10/2008 | Hood, III et al. | |
| 7,597,250 B2 * | 10/2009 | Finn | 235/380 |
| 7,779,192 B2 * | 8/2010 | Okamoto et al. | 710/301 |
| 2005/0270298 A1 * | 12/2005 | Thieret | 345/502 |
| 2006/0092928 A1 | 5/2006 | Pike et al. | |
| 2006/0168377 A1 | 7/2006 | Vasudevan et al. | |
| 2007/0073959 A1 | 3/2007 | McAfee et al. | |
| 2008/0146265 A1 * | 6/2008 | Valavi | 455/550.1 |
| 2008/0168204 A1 | 7/2008 | Sultenfuss et al. | |
| 2008/0182622 A1 * | 7/2008 | Makarowski et al. | 455/558 |
| 2008/0229058 A1 * | 9/2008 | Le et al. | 712/13 |
| 2009/0066704 A1 * | 3/2009 | Daniel et al. | 345/501 |
| 2009/0193243 A1 * | 7/2009 | Ely | 713/2 |
| 2010/0125689 A1 * | 5/2010 | Chang et al. | 710/301 |

* cited by examiner

*Primary Examiner* — Mark Rinehart
*Assistant Examiner* — Christopher A Daley
(74) *Attorney, Agent, or Firm* — Larson Newman, LLP

(57) ABSTRACT

A system includes a minicard socket, a controller, a south bridge, and a differential multiplexer. The minicard socket is configured to receive a plurality of types of minicards. The controller is in communication with the minicard socket, and is configured to determine which one of the plurality of types of minicards is received within the minicard socket. The south bridge is configured to communicate with the minicard received within the minicard socket. The differential multiplexer is in communication with the controller and with the minicard socket. The differential multiplexer configured to switch the south bridge and the minicard socket between communicating over a plurality of buses based on the type of minicard received within the minicard socket.

19 Claims, 4 Drawing Sheets

MULTIPLE MINICARD INTERFACE SYSTEM AND METHOD THEREOF

FIELD OF THE DISCLOSURE

This disclosure relates generally to information handling systems, and more particularly relates to a multiple minicard interface system and method thereof.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements can vary between different applications, information handling systems can also vary regarding what information is handled, how the information is handled, how much information is processed, stored, or communicated, and how quickly and efficiently the information can be processed, stored, or communicated. The variations in information handling systems allow for information handling systems to be general or configured for a specific user or specific use such as financial transaction processing, airline reservations, enterprise data storage, or global communications. In addition, information handling systems can include a variety of hardware and software components that can be configured to process, store, and communicate information and can include one or more computer systems, data storage systems, and networking systems.

The components of an information handling system can include a processor, a chipset, a cache, a memory, expansion cards, and storage devices. These components communicate with each other over one or more buses. A bus is a channel over which information flows between two or more devices. A bus normally has access points, or places to which a device can connect to the bus. Once connected, devices on the bus can send to, and receive information from, other devices. One type of bus is the local input/output (I/O) bus that connects peripherals to the memory, chipset, and processor. Video cards, disk storage devices, and network interface cards generally use this bus. The two most common I/O buses are the VESA local bus (VLB) and the Peripheral Component Interconnect (PCI) bus.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be utilized in this application.

Figure 1:
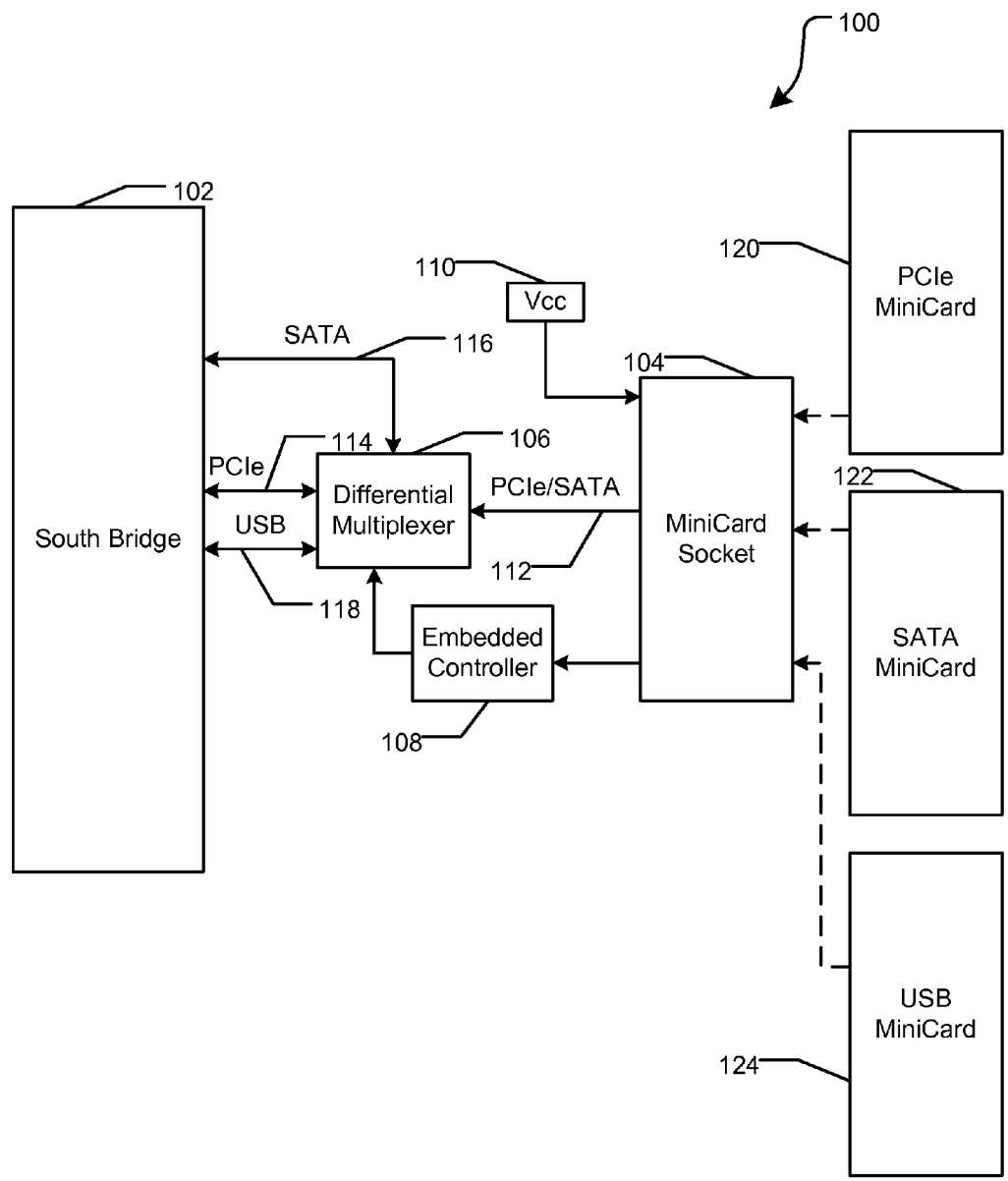
FIG. 1 is a block diagram of a minicard interface system.

FIG. 1 shows a minicard interface system 100 of an information handling system. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network server or storage device, a switch router or other network communication device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communications between the various hardware components.

The minicard interface system 100 includes a south bridge 102, a minicard socket 104, a differential multiplexer 106, an embedded controller 108, a voltage reference 110, a peripheral component interface express/serial advanced technology attachment (PCIe/SATA) bus 112, a PCIe bus 114, a SATA bus 116, and a universal serial bus (USB) 118. The minicard socket 104 is in communication with the differential multiplexer 106 via the PCIe/SATA bus 112. The minicard socket 104 is also in communication with the embedded controller 108 which in turn is in communication with the differential multiplexer 106. The south bridge 102 can communicate with the differential multiplexer 106 over the PCIe bus 114, the SATA bus 116, and/or the USB 118.

The minicard socket 104 is configured to connect the minicard interface system 100 to a plurality of minicards, such as a PCIe minicard 120, a SATA minicard 122, and a USB minicard 124. A minicard can be a communication device, a memory device, and the like that is configured to be received within the minicard socket 104. The minicard preferably has specific dimensions, number of pins, and the like that are different than a conventional interface card. For example, the minicard can preferably have a width that is smaller than a conventional interface card. In an embodiment, the minicard can have a width substantially equal to thirty millimeters. Based on the minicard inserted into the minicard socket 104, the reference voltage 110 can provide the minicard socket and the minicard with a differential supply voltage level. When a minicard is inserted into the minicard socket 104, the embedded controller 108 can determine the presence of the minicard and the type of minicard, such as the PCIe minicard 120, the SATA minicard 122, and the USB minicard 124.

Upon detecting the presence of the minicard, the embedded controller 108 can determine whether the minicard was previously connected to the minicard socket 104. If so, the embedded controller 108 can obtain the information previously determined about the minicard, such as the type of minicard, and send the corresponding information to the differential multiplexer 106. In one embodiment, the previously determined information can be stored in a local memory within the embedded controller 108 and/or an external memory in communication with the embedded controller. However, if the minicard has not been previously connected to the minicard socket 104, the embedded controller 108 can determine information about the minicard such as the type of minicard.

Upon the embedded controller 108 determining the type of minicard located within the minicard socket 104, the embedded controller can send a minicard identification signal identifying the type of minicard to the differential multiplexer 106. The differential multiplexer 106 can use the minicard identification signal to provide communication between the minicard socket 104 and the south bridge 102 via the corresponding bus, such as the PCIe bus 114, the SATA bus 116, and/or the USB 118.

The PCIe minicard 120, the SATA minicard 122, and the USB minicard 124 can each have substantially the same pin layout, such that the pins on the minicard line up with connections on the minicard socket 104. However, even though each of the minicards can have substantially the same pin layout, the pins of the minicards can have different uses and/or voltage requirements. For example, each of the minicards 120, 122, and 124 can use the same pin as the power supply input for the minicard but the required supply voltage can vary between minicards. In one embodiment, the PCIe minicard 120 and the USB minicard 124 can require a first supply voltage amount, and the SATA minicard 122 can require a second supply voltage amount. Also, the other pins on the minicard can be utilized to communicate different information to and from the south bridge 102 based on the minicard 120, 122, or 124. Thus, if each minicard 120, 122, or 124 was placed in communication with the south bridge 102 over the same bus, the south bridge may not be able to communicate with each of the minicards because the bus is identifying the information incorrectly to the south bridge.

Therefore, each minicard capable of be connected into the minicard socket 104 may need a compatible bus for communication with the south bridge 102. Each of the minicards can transmit signals to the differential multiplexer 106 over the same communication bus, the PCIe/SATA bus 112, because the differential multiplexer 106 does not process the signals. The differential multiplexer 106 can then connect the PCIe/SATA bus 112 with the PCIe bus 114, the SATA bus 116, or the USB 118 based on the minicard identification signal received from the embedded controller 108. Thus, a signal can be transmitted from the minicard socket 104 over the PCIe/SATA bus 112, in the differential multiplexer 106, and then to the south bridge 102 over the bus that corresponds with the minicard located within the minicard socket.

For example, if the PCIe minicard 120 is inserted within the minicard socket 102, the embedded controller 108 can detect the presence of the minicard and determine that the minicard is the PCIe minicard. The embedded controller 108 can send the minicard identification signal to the differential multiplexer which in turn can connect the PCIe bus 114 with the PCIe/SATA bus 112 based on the minicard identification signal. Thus, the PCIe minicard 120 can properly communicate with the south bridge 102 via the PCIe/SATA bus 112, the differential multiplexer 106, and the PCIe bus 114.

In an embodiment, the system 100 can be set up so that the PCIe bus 114 is the default bus between the south bridge 102 and the differential multiplexer 106. In this situation, the differential multiplexer 106 can change the bus connection between the differential multiplexer and the south bridge 102 if the differential multiplexer determines that the minicard is the SATA minicard 122 or the USB minicard 124 based on the minicard identification signal. In another embodiment, the default bus between the south bridge 102 and the differential multiplexer 106 can be either the SATA bus 116 or the USB 118.

Figure 2:
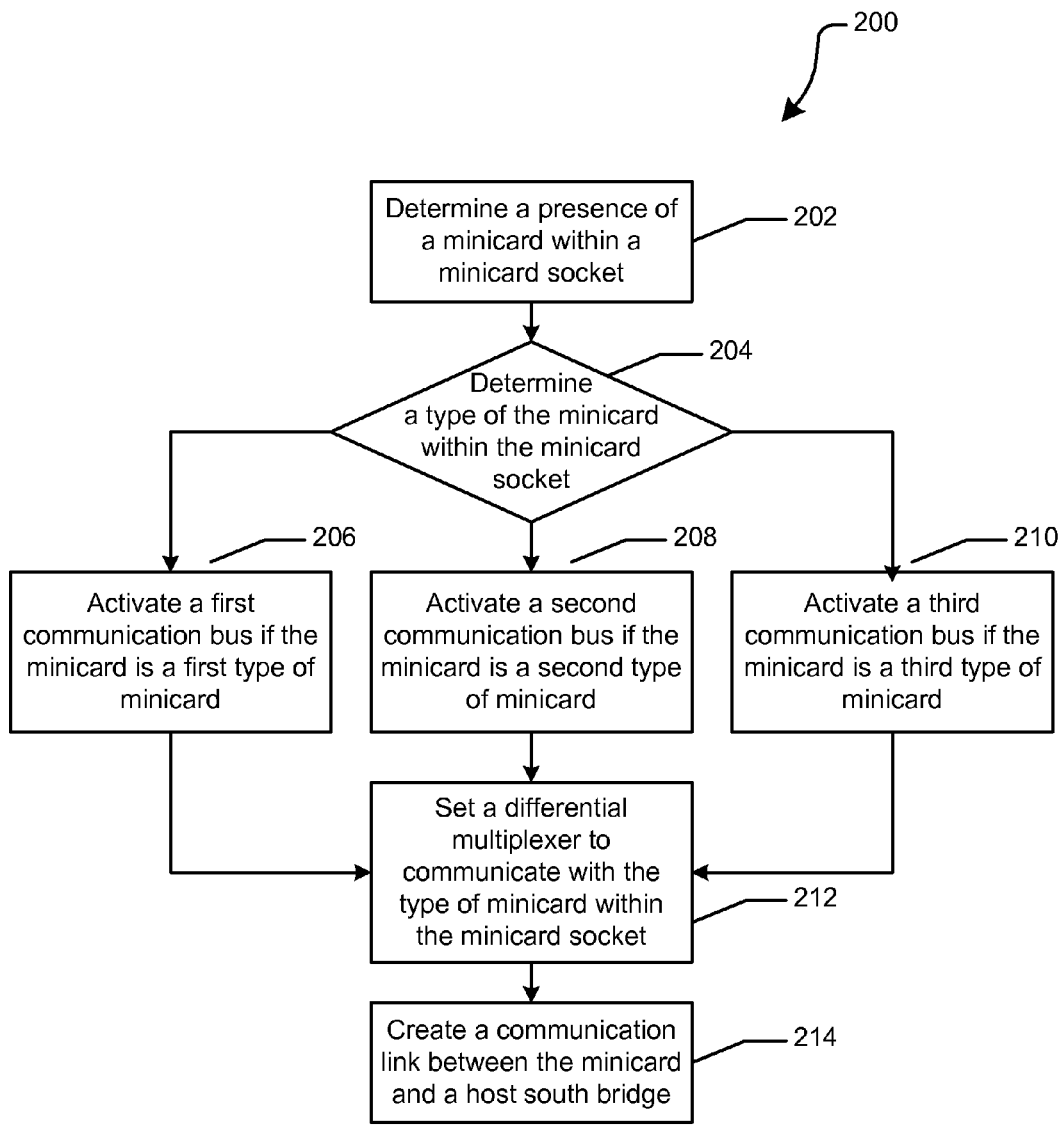
FIG. 2 is a flow diagram of method for selecting a communication bus between a minicard socket and a south bridge of the minicard interface system.

FIG. 2 shows a flow diagram of a method 200 for selecting a communication bus between a minicard socket and a south bridge of the minicard interface system. At block 202, a presence of a minicard within a minicard socket is determined. A type of minicard is determined for the minicard within the minicard socket at block 204. At block 206, if the minicard is a first type of minicard, a first communication bus is activated between a differential multiplexer and a south bridge. If the minicard is a second type of minicard, a second communication bus is activated between the differential multiplexer and the south bridge at block 208. At block 210, if the minicard is a third type of minicard, a third communication bus is activated between the differential multiplexer and the south bridge. At block 212, a differential multiplexer is set to communicate with the minicard within the minicard socket. A communication link is created between the minicard and the south bridge at block 214.

Figure 3:
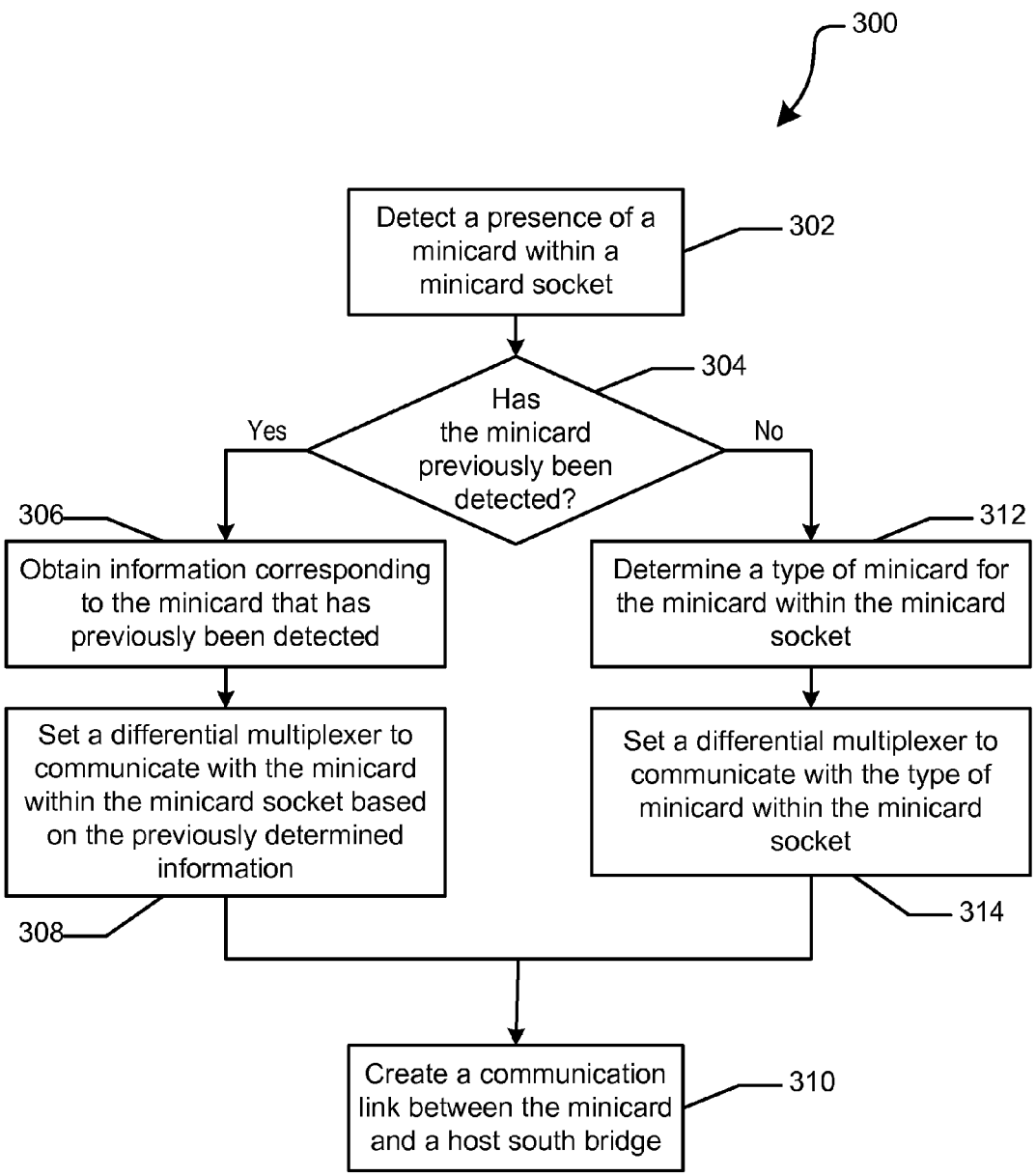
FIG. 3 is a flow diagram of an alternative method for selecting a communication bus between the minicard socket and the south bridge of the minicard interface system.

FIG. 3 shows a flow diagram of a method 300 for selecting a communication bus between a minicard socket and a south bridge of the minicard interface system. At block 302, a presence of a minicard within a minicard socket is detected. A determination is made whether the minicard has previously been detected at block 304. At block 306, if the minicard has previously been detected, information corresponding to the minicard that has previously been detected is obtained. The information for previously detected minicards can be stored within the device detecting the minicard and/or a memory external from the device detecting the minicard.

A differential multiplexer is set to communicate with the minicard within the minicard socket based on the previously determined information at block 308. At block 310, a communication link is created between the minicard and the south bridge. If the minicard has not been previously detected, a type of minicard is determined for the minicard within the minicard socket at block 312. At block 314, a differential multiplexer is set to communicate with the type of minicard within the minicard socket. The communication link is created between the minicard and the south bridge at block 310.

Figure 4:
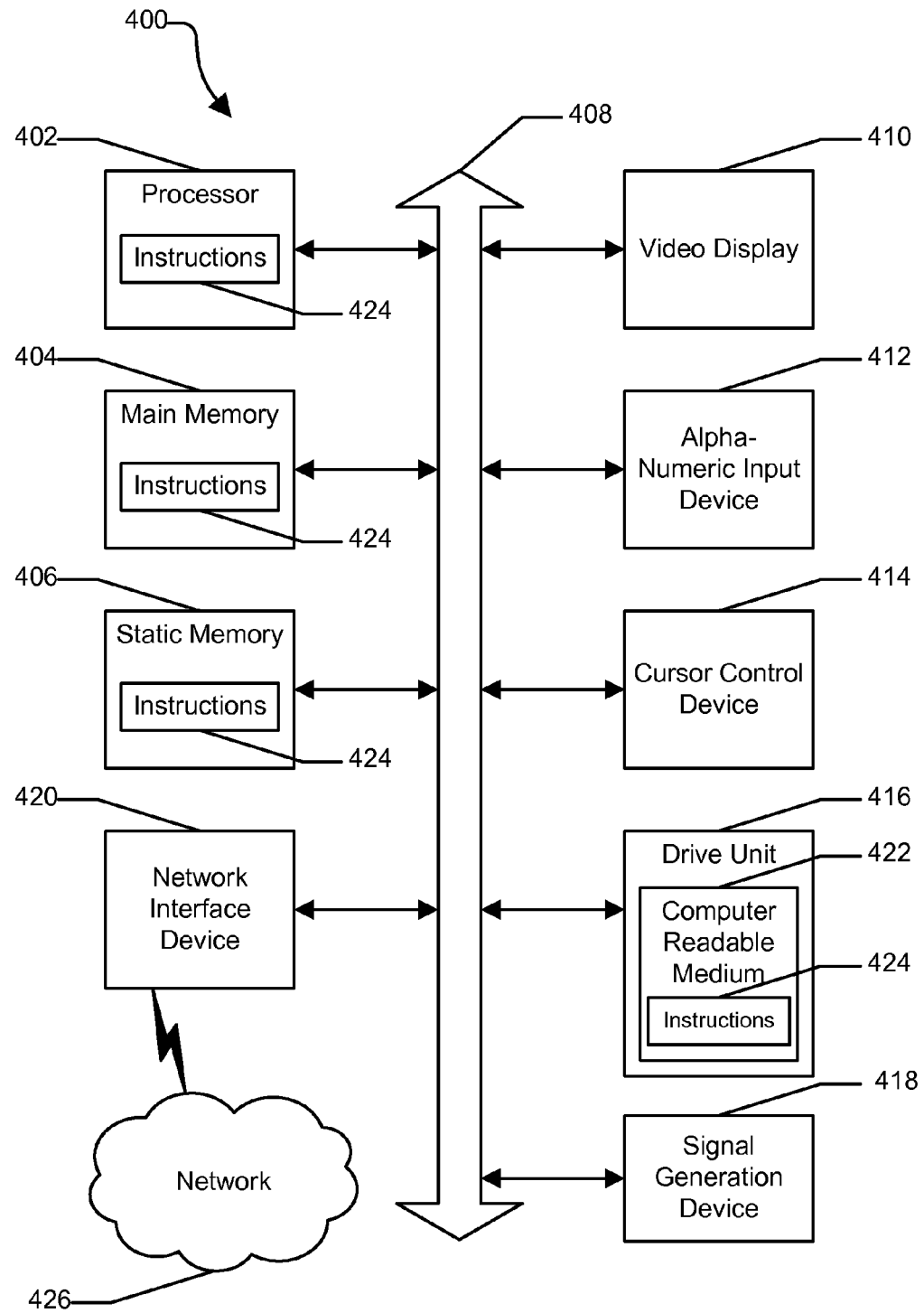
FIG. 4 is a block diagram of a general computer system.

FIG. 4 shows an illustrative embodiment of a general computer system 400 in accordance with at least one embodiment of the present disclosure. The computer system 400 can include a set of instructions that can be executed to cause the computer system to perform any one or more of the methods or computer based functions disclosed herein. The computer system 400 may operate as a standalone device or may be connected such as using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 400 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 400 can be implemented using electronic devices that provide voice, video or data communication. Further, while a single computer system 400 is illustrated, the term "system" shall also be taken to include any collection of systems or sub-systems that individually or jointly execute a set, or multiple sets, of instructions to perform one or more computer functions.

The computer system 400 may include a processor 402 such as a central processing unit (CPU), a graphics processing unit (GPU), or both. Moreover, the computer system 400 can include a main memory 404 and a static memory 406 that can communicate with each other via a bus 408. As shown, the computer system 400 may further include a video display unit 410, such as a liquid crystal display (LCD), an organic light emitting diode (OLED), a flat panel display, a solid state display, or a cathode ray tube (CRT). Additionally, the computer system 400 may include an input device 412, such as a keyboard, and a cursor control device 414, such as a mouse. The computer system 400 can also include a disk drive unit 416, a signal generation device 418, such as a speaker or remote control, and a network interface device 420.

In a particular embodiment, as depicted in FIG. 4, the disk drive unit 416 may include a computer-readable medium 422 in which one or more sets of instructions 424 such as software, can be embedded. Further, the instructions 424 may embody one or more of the methods or logic as described herein. In a particular embodiment, the instructions 424 may reside completely, or at least partially, within the main memory 404, the static memory 406, and/or within the processor 402 during execution by the computer system 400. The main memory 404 and the processor 402 also may include computer-readable media. The network interface device 420 can provide connectivity to a network 426, e.g., a wide area network (WAN), a local area network (LAN), or other network.

In an alternative embodiment, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 424 or receives and executes instructions 424 responsive to a propagated signal, so that a device connected to a network 426 can communicate voice, video or data over the network 426. Further, the instructions 424 may be transmitted or received over the network 426 via the network interface device 420.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A system comprising:
a minicard socket configured to receive a plurality of types of minicards;
a controller in communication with the minicard socket, the controller configured to determine which one of the plurality of types of minicards is received within the minicard socket;
a south bridge configured to communicate with the minicard received within the minicard socket; and
a differential multiplexer in communication with the controller and with the minicard socket, the differential multiplexer configured to switch communication of the south bridge and the minicard socket among a plurality of buses based on the type of minicard received within the minicard socket;
a first bus of the plurality of buses configured to provide a first communication path between the differential multiplexer and the south bridge; and
a second bus of the plurality of buses configured to provide a second communication path between the differential multiplexer and the south bridge.

2. The system of claim 1 further comprising:
a third bus of the plurality of buses configured to provide a third communication path between the differential multiplexer and the south bridge.

3. The system of claim 1 wherein the first bus is a peripheral component interconnect express bus.

4. The system of claim 1 wherein the second bus is a serial advanced technology attachment bus.

5. The system of claim 1 wherein the first type of the minicard is a peripheral component interconnect express minicard.

6. The system of claim 1 wherein the second type of the minicard is a serial advanced technology attachment minicard.

7. A method comprising:
   determining a presence of a minicard within a minicard socket;
   determining a type of the minicard within the minicard socket in response to determining the presence of the minicard;
   setting a differential multiplexer to communicate with the minicard in response to determining the type of the minicard; and
   creating a communication link between the minicard and a south bridge via the differential multiplexer wherein the differential multiplexer is configured to switch communication with the south bridge among a plurality of buses.

8. The method of claim 7 wherein creating the communication link further comprises:
   activating a first bus based on the minicard being a first type; and
   activating a second bus based on the minicard being a second type.

9. The method of claim 8 wherein the first type of the minicard is a peripheral component interconnect express minicard.

10. The method of claim 8 wherein the second type of the minicard is a serial advanced technology attachment minicard.

11. The method of claim 8 wherein the first bus is a peripheral component interconnect express bus.

12. The method of claim 8 wherein the second bus is a serial advanced technology attachment bus.

13. A method comprising:
    detecting a presence of a minicard within a minicard socket;
    determining whether the minicard within the minicard socket has been previously detected;
    if the minicard has been previously detected, obtaining information corresponding to the minicard, wherein the information includes a type of minicard for the minicard within the minicard socket;
    setting a differential multiplexer to communicate with the minicard within the minicard socket based on the previously determined information;
    if the minicard has not been previously detected, determining the type of minicard within the minicard socket;
    setting the differential multiplexer to communicate with the type of minicard within the minicard socket based on the type of the minicard; and
    creating a communication link between the minicard and a south bridge.

14. The method of claim 13 wherein the type of the minicard is a peripheral component interconnect express minicard.

15. The method of claim 13 wherein the type of the minicard is a serial advanced technology attachment minicard.

16. The method of claim 13 wherein the type of the minicard is a universal serial bus minicard.

17. The method of claim 13 wherein the communication link is a peripheral component interconnect express bus.

18. The method of claim 13 wherein the communication link is a serial advanced technology attachment bus.

19. The method of claim 13 wherein the communication link is a universal serial bus.

* * * * *